United States Patent Office
3,458,074
Patented July 29, 1969

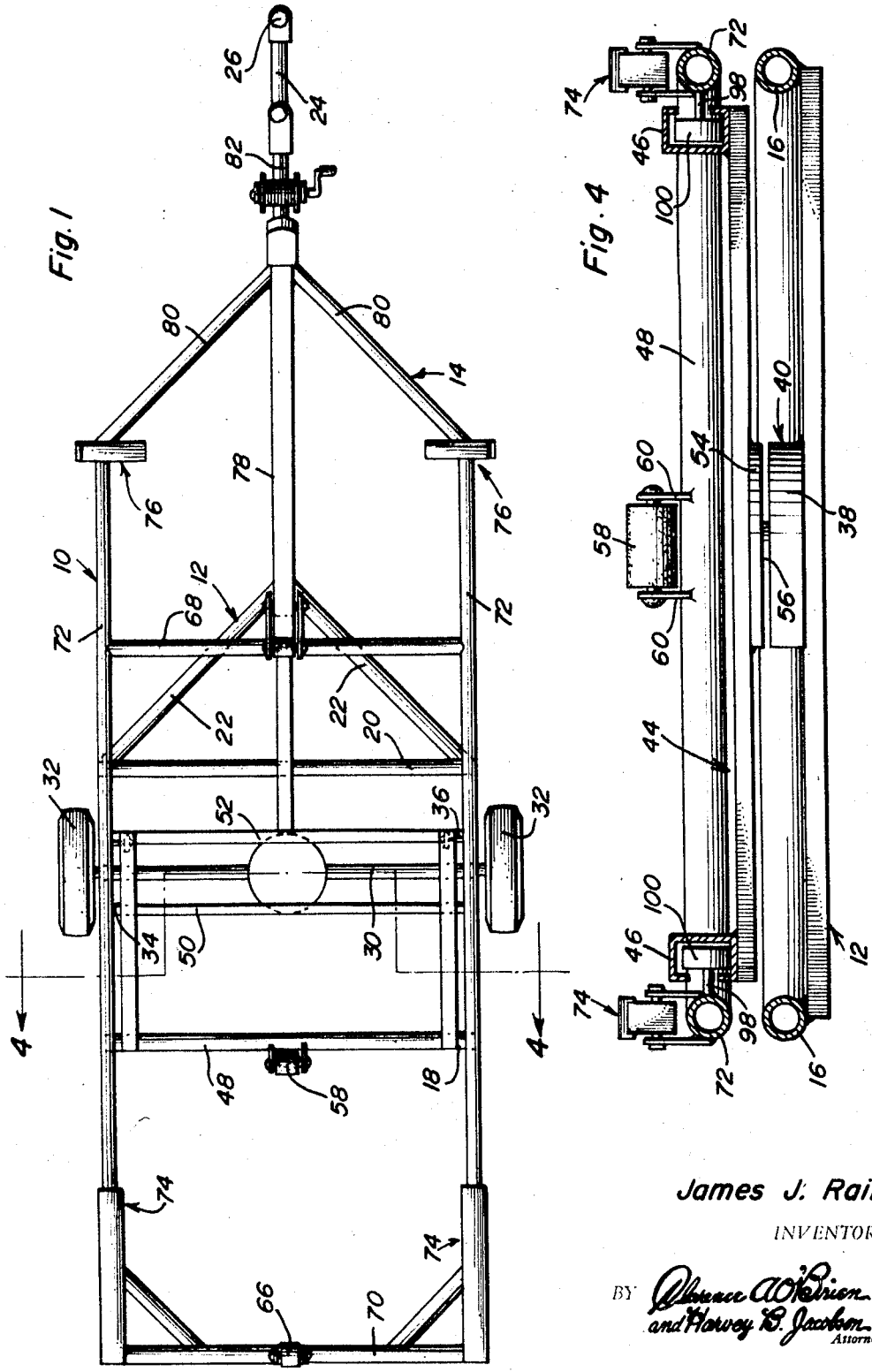

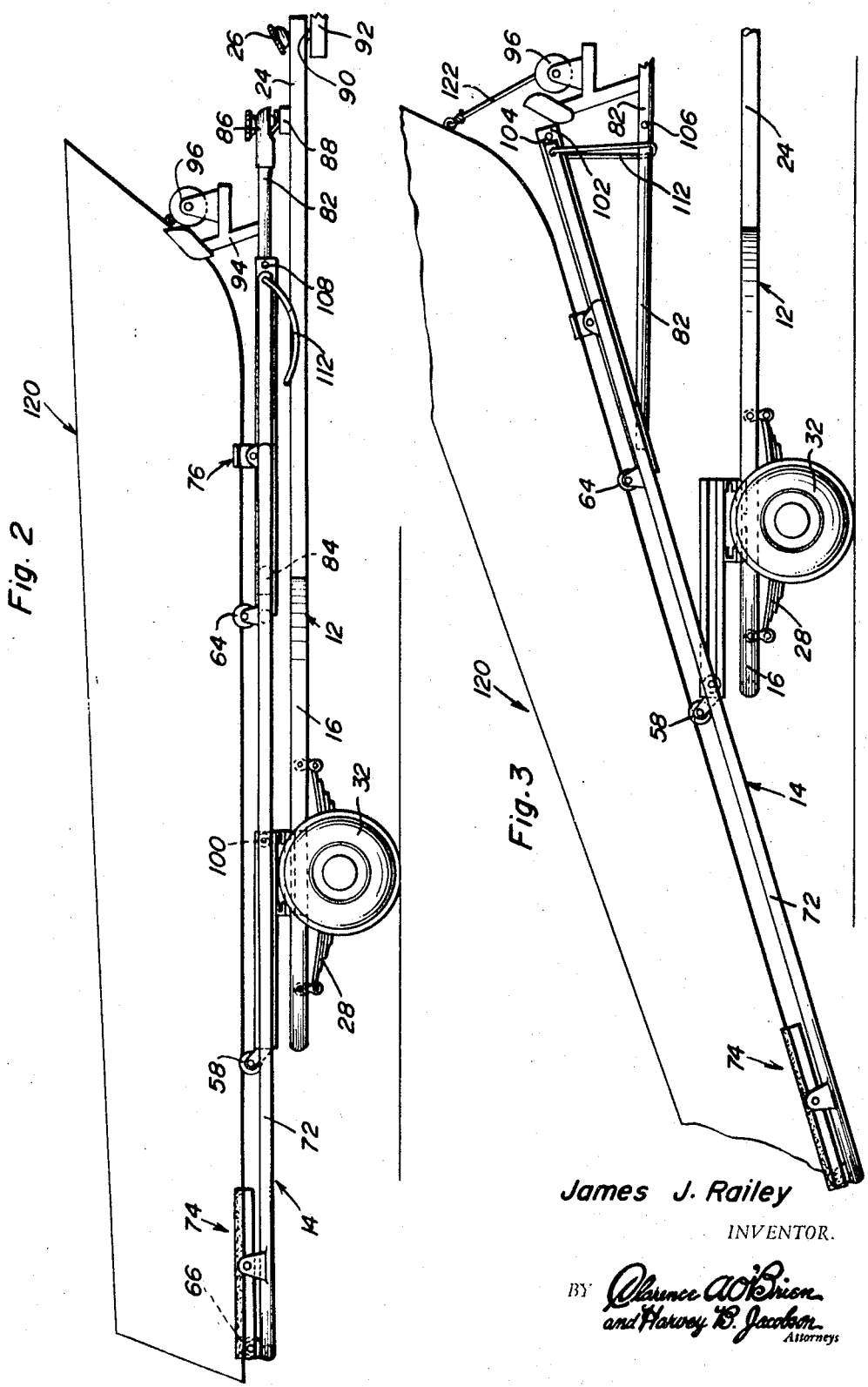

3,458,074
BOAT TRAILER WITH TILTABLE AND
ROTATABLE BOAT CRADLE FRAME
James J. Railey, 2909 Wakula Ave.,
Panama City, Fla. 32401
Filed July 31, 1967, Ser. No. 657,112
Int. Cl. B60p 3/00, 3/10
U.S. Cl. 214—505                                     6 Claims

ABSTRACT OF THE DISCLOSURE

A trailer for transporting boat hulls from one location to another and including a main wheeled frame from which a mounting structure including opposite end portions is rotatably supported for oscillation about a vertical axis and from which a boat cradling subframe is pivotally supported for rotation about a horizontal transverse axis shiftable longitudinally of the mounting structure.

---

The boat trailer subframe which is adapted to cradle a boat hull is similar to a conventional tiltable boat cradling portion of conventional tilt-type boat trailers except that the subframe is oscillatable between established limit positions longitudinally of the trailer and also oscillatable about an upstanding axis.

This structure adapts the boat trailer to be more readily utilized in launching and retrieving an associated boat hull under various circumstances as will be hereinafter more fully set forth.

The main object of this invention is to provide a boat trailer constructed in a manner so as to provide means enabling an associated boat to be more easily launched and retrieved.

Another object of this invention, in accordance with the immediately preceding object, is to provide a boat trailer including structural features thereof which particularly well adapt the boat trailer to launch and retrieve a boat from a ramp or bank which is gradually inclined downwardly into the water.

Still another object of this invention, in accordance with the preceding objects, is to provide a boat trailer including structural features thereof also adapted to launch and retrieve a boat from a bank portion of the shoreline of a body of water without backing the wheels of the trailer into the water.

A final object of this invention to be specifically enumerated herein is to provide a boat trailer in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the boat trailer of the instant invention;

FIGURE 2 is a side elevational view of the assemblage illustrated in FIGURE 1 and with a boat hull disposed on the trailer in trailering position thereon;

FIGURE 3 is a fragmentary side elevational view similar to FIGURE 2 but with the boat cradling subframe of the trailer pivoted downwardly at its rear end and shifted to its rearmost position relative to the main frame portion of the trailer; and FIGURE 4 is an enlarged transverse vertical sectional view taken substantially upon the plane indicated by the section line 4—4 of FIGURE 1.

Referring now more specifically to the drawings, the numeral 10 generally designates the boat trailer which may be seen to include a main frame structure referred to in general by the reference numeral 12 and a subframe boat cradling structure generally referred to be the reference numeral 14.

The main frame or frame structure 12 is somewhat conventional in design in that it includes a pair of opposite side longitudinally extending members 16 interconnected at their rear ends by means of a rear transverse member 18 and at their forward ends by means of a front transverse member 20. The main frame 12 also includes a pair of forwardly convergent opposite side members 22 whose rear ends are secured to the forward ends of the longitudinal members 16 and whose forward ends are secured to opposite side portions of a forwardly projecting tongue portion 24 having a socket hitch assembly 26 on its forward end. A pair of oposite side leaf spring assemblies 28 are supported from the rear end portions of the longitudinal members 16 and the opposite ends of an axle 30 including wheels 32 are supported from the leaf spring assemblies 28 centrally intermediate their opposite ends.

The main frame 12 further includes a pair of longitudinally spaced and transversely extending brace members 34 and 36 which extend between and are secured to the longitudinal members 16. The brace members 34 and 36 are disposed on opposite sides of the vertical plane containing the axle 30 and a lower turntable half 38 of a turntable assembly generally referred to by the reference numeral 40 is supported from the brace members 34 and 36 centrally intermediate their opposite ends.

The upper half of the turntable assembly 40 is generally referred to by the reference numeral 44 and includes a pair of opposite side longitudinally extending C-shaped channel members 46 interconnected at their rear ends by means of a rear transverse member 48 and at their forward end portions by means of a pair of transversely extending and longitudinally spaced brace members 50 and 52. The brace members 50 and 52 dependingly support from their midportions a disc-shaped upper portion 54 and a pivot axle or pin 56 rotatably supports the upper portion 54 from the lower half 38 for oscillation about a vertical axis. The rear transverse member has a keel supporting roller 58 journaled between a pair of uprights 60 carried by the transverse member 48 and the roller 58 is at least generally horizontally aligned with a pair of similar rollers 64 and 66 carried by transverse members 68 and 70 of the subframe 14 which extend between the longitudinal opposite side members 72 of the subframe 14.

The subframe 14 includes a pair of rear opposite side boat hull supporting pad assemblies generally referred to by the reference numerals 74 and a pair of forward hull supporting pad assemblies generally referred to by the reference numerals 76 carried by the forward ends of the longitudinal members 72.

The forward end portion of the subframe 14 includes a longitudinally extending inverted channel member 78 secured at its rear end to the transverse member 68 and to whose forward end the forwardly convergent ends of a pair of side members 80 are secured, the rear ends of the forwardly convergent side members 80 being secured to the forward ends of the longitudinal members 72.

A towing tongue 82 has its rear end portion disposed within the inverted channel-shaped member 78 and pivotally secured to the rear end thereof as at 84. The forward end of the towing tongue portion 82 includes a socket member assembly 86 similar to the socket hitch assembly 26 and which is removably engaged with a ball hitch element 88 carried by the tongue portion 24 slightly rearwardly of the socket hitch assembly 26. Of course, the socket hitch assembly 26 is removably coupled with a ball hitch element 90 carried by the towing hitch 92 of a draft vehicle (not shown), see FIG. 2, and the towing tongue or tongue portion 82 includes a bow stop standard 94 and a winch assembly generally referred to by the reference numeral 96.

The longitudinal members 72 include inwardly projecting stub axle portions 98 upon whose adjacent ends rollers 100 are journaled and it may be seen from FIG. 4 of the drawings that the rollers 100 are held captive in the C-shaped channel members 46, the opposite ends of the latter being suitably closed in any convenient manner.

The forward end of the channel-shaped member 78 projects forwardly of the forward ends of the side members 80 and the opposite side flange portions 102 of the channel-shaped member 78 include apertures 104 which are registrable with diametrically aligned apertures 106 formed in the towing tongue or portion 82. A suitable fastener 108 may be removably passed through the apertures 104 and the apertures 106 to retain the tongue portion 82 and the channel-shaped member 78 in nested relation such as that illustrated in FIG. 2 of the drawings. Further, the subframe 14 includes a tethering loop 112 which is operative to limit pivoting movement of the tongue portion 82 in the manner illustrated in FIG. 3 of the drawings.

In operation, and assuming the components of the trailer 10 to be positioned as illustrated in FIG. 2 of the drawings supporting a boat hull 120 from the trailer 10, the winch line 122 may be slackened and the pin 108 may be removed so as to allow the tongue portion 82 to swing downwardly relative to the forward end of the channel-shaped member 78 in the manner illustrated in FIG. 3 of the drawings. Then, the socket member assembly 86 may be removed from engagement with the ball hitch element 88 so as to enable the subframe 14 to shift rearwardly relative to the main frame 12 upon rearward rolling movement of the rollers 100 from the forward ends of the channel-shaped members 46 to the rear ends thereof. Thereafter, the winch assembly 96 may be actuated to further slacken the winch rope 122 so that the boat hull 120 will move rearwardly and downwardly along the rearwardly and downwardly inclined subframe 14 while supported on the rollers 58, 64 and 66. Of course, the boat hull 120 may be loaded onto the trailer 10 by reversing the above steps.

It is proposed that the center of gravity of the boat hull 120 be positioned generally vertically above a transverse vertical plane containing the rollers 100. In this manner, the weight of the boat hull 120 will be centered slightly forwardly of the axle 30 and will thus cause the forward end of the tongue portion 24 to bear down on the hitch assembly 92 with sufficient force to enable the trailer 10 to be trailed at high speed without swaying from side to side. Of course, inasmuch as the center of gravity of the boat hull 120 is disposed over the rollers 100, the forward end of the tongue portion 82 may be readily raised in the manner illustrated in FIG. 3 of the drawings. Thus, the subframe 14 may be tilted and slid to its rearmost position such as that illustrated in FIG. 3 of the drawings manually and with little effort on the part of the person handling the trailer 10 and boat 120.

When the subframe 14 is positioned as illustrated in FIG. 3 of the drawings, the center of gravity of the boat hull 120 is disposed appreciably behind the axle 30 and therefore when the boat hull 120 is positioned as illustrated in FIG. 3, the forward end of the tongue portion 24 does not bear down upon the hitch assembly 92.

Inasmuch as the winch assembly 96 is carried by the tongue portion 82, once the boat hull 120 has been loaded onto the subframe 14 and the tongue portion 82 has been swung to the position nested within the channel-shaped member 78, the bow of the boat hull 120 may be anchored to the bow stop 94 and the winch rope or cable 122 may be utilized to pull the subframe 14 toward its forwardmost position and to also swing the forward end of the tongue portion 82 downwardly toward engagement with the ball hitch element 88 should the subframe 14 have its center of gravity disposed slightly rearwardly of the rollers 100 while still forwardly of the axle 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trailer comprising a generally horizontal wheeled main frame including a first forwardly projecting tongue portion, said main frame including a mounting structure, a generally horizontal load frame including front and rear ends extending longitudinally of said main frame, means pivotally securing the rear end portion of said load frame to said mounting structure for oscillation about a horizontal axis extending transversely of said load frame said mounting structure being supported from said main frame for oscillation about a vertical axis, said load frame including a second forwardly projecting tongue portion overlying said first tongue portion, the forward end of said second tongue portion terminating rearwardly of the forward end of the first tongue portion, the rear end of the second tongue portion being oscillatably secured to the forward end of the load frame for swinging about a horizontal transverse axis, means carried by the forward end of the load frame tongue portion and an adjacent part of the main frame tongue portion releasably securing the forward end of the second tongue portion to said first tongue portion, and means operative to releasably secure the second tongue portion against oscillation relative to said load frame.

2. The combination of claim 1 wherein the axis of rotation of said load frame relative to said main frame is stationarily positioned relative to said load frame and shiftable with the latter relative to said mounting structure.

3. The combination of claim 1 wherein the axis of rotation of said load frame relative to said main frame is stationarily positioned relative to said load frame and shiftable with the latter relative to said mounting structure.

4. The combination of claim 1 wherein said trailer includes means operatively associated with said load frame and said second tongue portion limiting downward swinging movement of said second tongue portion relative to said load frame.

5. A trailer comprising a generally horizontal wheeled main frame including a forwardly projecting tongue portion, said main frame including a mounting structure, a generally horizontal load frame including front and rear ends extending longitudinally of said main frame and having its rear end portion pivotally secured to said mounting structure for oscillation about a horizontal axis extending transversely of said load frame and for limited shifting of said load frame longitudinally of said main frame, said trailer main frame including a forwardly projecting towing tongue, said load frame, when loaded, having its center of gravity generally centered over said horizontal axis and the center of gravity of said load trailer being disposed at least slightly forwardly of the effective center of support of said main frame from the support wheels of said trailer, said center of gravity of said loaded trailer being disposed rearwardly of said effective center of support when said load frame is shifted rearwardly, said mounting structure being supported from said main frame for oscillation about a vertical axis.

6. The combination of claim 5 including means carried by said load frame and releasably engageable with said main frame to retain said load frame in predetermined oscillated position relative to said mounting structure, said axis of oscillation about a horizontal axis in a predetermined forwardly shifted position and said mounting structure in predetermined oscillated position relative to said main frame.

References Cited
UNITED STATES PATENTS

| | | | |
|---|---|---|---|
| 1,319,118 | 10/1919 | Rush et al. | 298—14 |
| 1,362,819 | 12/1920 | Reynolds et al. | 298—14 |
| 1,432,328 | 10/1922 | Gee. | |
| 2,808,953 | 10/1957 | Whitney | 214—505 |
| 3,058,608 | 10/1962 | Lewis | 214—505 |
| 3,127,042 | 3/1964 | Beckham | 214—505 |

ALBERT J. MAKAY, Primary Examiner